United States Patent [19]

Bianchetta et al.

[11] Patent Number: 5,063,739

[45] Date of Patent: Nov. 12, 1991

[54] LOAD SENSING HYDRAULIC CONTROL SYSTEM

[75] Inventors: Donald L. Bianchetta, Coal City; Gregory W. Heinz, Minooka, both of Ill.

[73] Assignee: Caterpillar Inc., Peoria, Ill.

[21] Appl. No.: 656,661

[22] Filed: Feb. 19, 1991

[51] Int. Cl.[5] .............. F16D 31/02

[52] U.S. Cl. .............. 60/421; 60/430

[58] Field of Search .............. 60/421, 430, 450, 452, 60/486

[56] References Cited

U.S. PATENT DOCUMENTS

| | | | |
|---|---|---|---|
| 3,987,626 | 10/1976 | Bianchetta | 60/452 |
| 3,987,704 | 10/1976 | Johnson | 60/421 |
| 3,991,571 | 11/1976 | Johnson | 60/422 |
| 4,112,821 | 9/1978 | Bianchetta | 60/486 |
| 4,345,436 | 8/1982 | Johnson | 60/421 |
| 4,495,766 | 1/1985 | Krusche | 60/428 |
| 4,665,699 | 5/1987 | Krusche | 60/452 |
| 4,802,336 | 2/1989 | Moyer et al. | 60/452 |

*Primary Examiner*—Edward K. Look
*Assistant Examiner*—F. Daniel Lopez
*Attorney, Agent, or Firm*—John W. Grant

[57] ABSTRACT

The use of a pair of small variable displacement hydraulic pumps in a hydraulic system offers some advantages. The output of the two pumps of the known systems is normally not combined, but is selectively combined under a majority of the operating conditions. The subject load sensing hydraulic control system has first and second hydraulic circuits with each circuit having a plurality of pilot operated control valves operatively connected to a variable displacement pump. The output flow of both pumps is normally made available to both hydraulic circuits through a combiner valve so that the output capability of both pumps can be used to satisfy the demand for fluid by a single control valve or by one or more of the control valves from each circuit. A valve arrangement connects the highest load pressure of the control system to both pumps when the output flow thereof is being combined. Under certain operating conditions of some of the control valves, the combiner valve and the valve arrangement are selectively moved to a position to isolate the first and second hydraulic circuits from each other and to direct the highest load pressure of each circuit only to the displacement controller of the pump connected to that circuit.

15 Claims, 4 Drawing Sheets

LOAD SENSING HYDRAULIC CONTROL SYSTEM

DESCRIPTION

1. Technical Field

This invention relates generally to a hydraulic control system and more particularly to a load sensing hydraulic control system having a pair of variable displacement pumps.

2. Background Art

In order to reduce costs, many hydraulic systems use two small variable displacement pumps as opposed to one larger variable displacement pump. A typical example of such a hydraulic system is the hydraulic system for many of today's hydraulic excavators which normally have five or six individually operable work elements. Such two pump hydraulic systems are usually divided into two separate circuits with each of the pumps serving one circuit. Under some operating conditions, it is desirable that the two hydraulic circuits be isolated from each other so that each pump serves only the respective circuit. However, under other operating conditions, it is desirable to be able to use the output of both pumps by one or more work elements of a single circuit or have the output of both pumps shared by one or more work elements of one circuit and by one or more work elements of the other circuit according to the demand by the individual work elements. To provide for that type of usage, the heretofore known hydraulic systems normally have the circuits isolated from each other and selectively combine the output of the pumps for use by either circuit in response to actuation of certain work elements. However, it has been determined that the number of operating conditions that benefit from having the circuits isolated from each other is less than the number of operating conditions that benefit from having the output of the pumps combined. Thus, it is desirable to provide a hydraulic system having the output of the pumps normally combined and having the circuits selectively isolated from each other only during preselected operating conditions.

DISCLOSURE OF THE INVENTION

In one aspect of the present invention, a hydraulic control system having a source of pressurized pilot fluid comprises first and second hydraulic circuits with each circuit including a variable displacement pump having a pressure responsive displacement controller, a supply conduit connected to the pump, a plurality of pressure compensated pilot operated control valves connected to the supply conduit, a plurality of pilot control valves connected to the source of pressurized pilot fluid, a pair of pilot lines connecting each of the pilot control valves to a respective one of the control valves to transmit pressurized pilot fluid thereto, and signal means for sensing the load pressures at the signal ports of the control valves and delivering a control signal corresponding to the highest load pressure of the circuit to a control line. A combiner valve is connected to the supply conduits of both circuits and is movable between a first position at which the supply conduits are in communication with each other and a second position at which the supply conduits are isolated from each other. A valve means is connected to the control lines of both circuits and is movable between a first position at which the higher control signal in the control lines is communicated to the pump displacement controller of both pumps and a second position at which the control signal in the control line of one of the circuits is blocked from the pump displacement controller of the pump of the other circuit. A means is provided for normally maintaining the combiner valve and the valve means at their first position. A means is provided for selectively moving the combiner valve and the valve means to their second position only when the summed highest pressures from one of preselected ones of the pilot lines of the first circuit and from one of preselected ones of the pilot lines of the second circuit exceeds a predetermined magnitude which is greater than the maximum pilot pressure individually transmitted through any single one of the preselected pilot lines.

BEST MODE FOR CARRYING OUT THE INVENTION

Figure 1A:
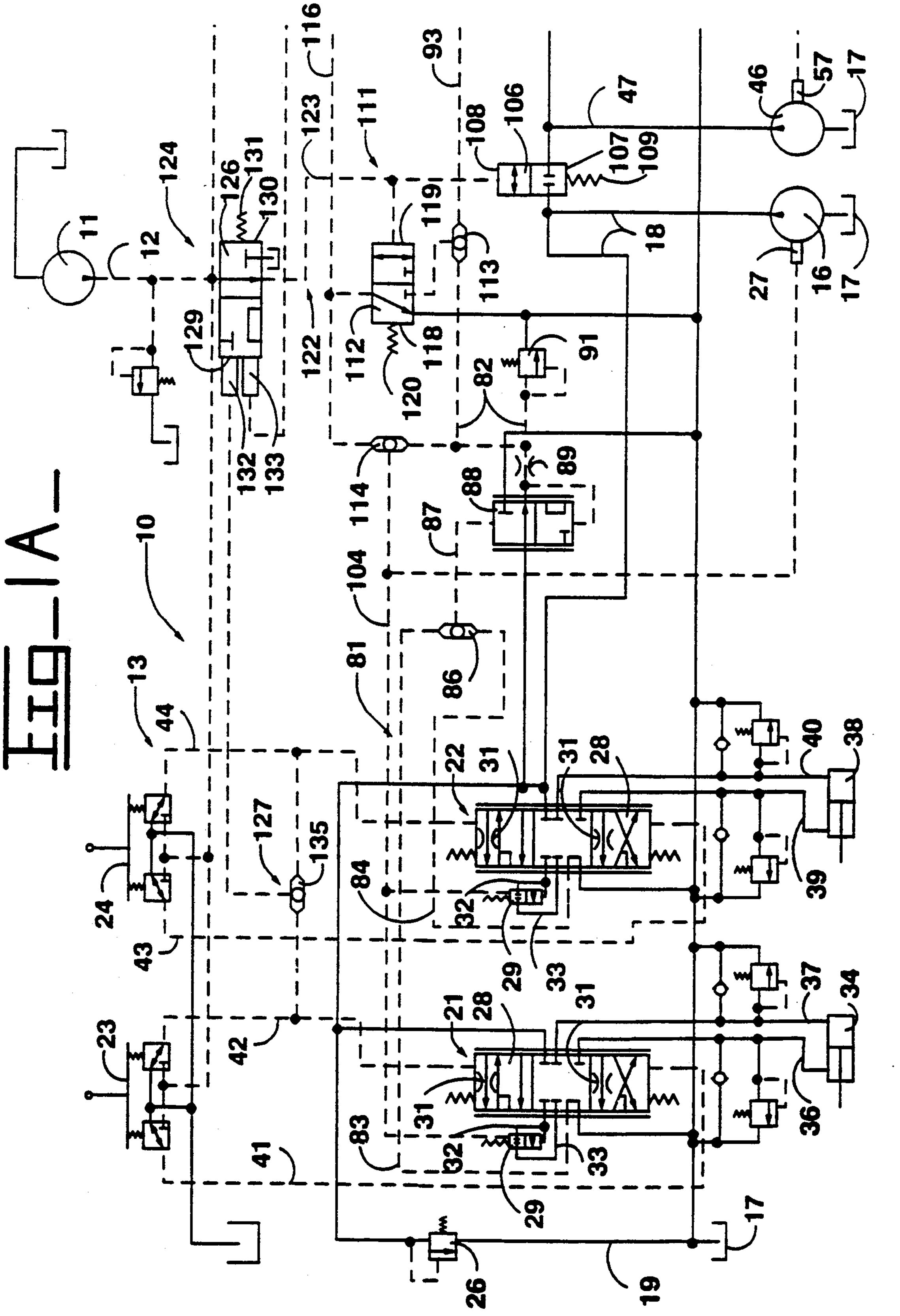
FIGS. 1A and 1B are schematic illustrations of an embodiment of the present invention.
Figure 1B:
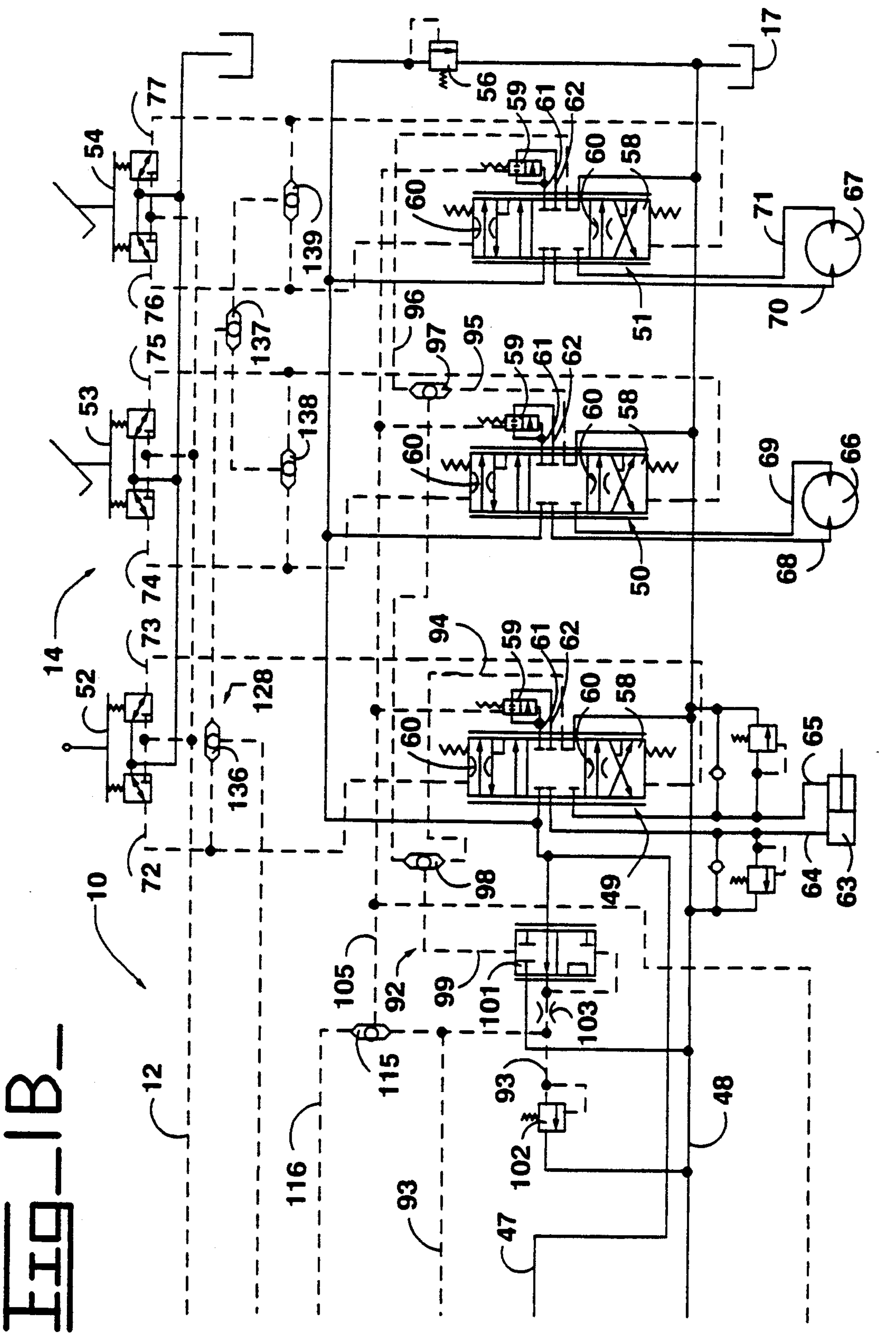

Referring now to FIGS. 1A and 1B, a hydraulic control system 10 includes a pilot pump 11 connected to a pilot supply line 12 and first and second hydraulic circuits 13,14. The first hydraulic circuit 13 includes a variable displacement pump 16 connected to a tank 17, a supply conduit 18 connected to the pump 16, a return conduit 19 connected to the tank 17, a pair of pressure compensated, pilot operated, control valves 21,22 connected to the supply and return conduits 18,19, a pair of pilot control valves 23,24 connected to the pilot supply line 12, and a system pressure relief valve 26 disposed between the supply and return conduits 18,19 in the usual manner. The variable displacement pump 16 has a pressure responsive displacement controller 27 for controlling the output flow and pressure of the pump.

Each of the control valves 21,22 include a pilot operated directional valve 28 and a pressure compensating valve 29. The directional valves 28 are connected to the supply conduit 18 and the return conduit 19 and have a pair of infinitely variable metering orifices 31. The pressure compensating valves 29 are individually disposed downstream of the metering orifices 31 and are connected to the directional valves in a series flow relationship through a feeder passage 32 and a return passage 33. The directional valve 28 of the control valve 21 is connected to a double acting hydraulic cylinder 34 through a pair of cylinder conduits 36,37. The directional valve 28 of the control valve 22 is connected to a double acting hydraulic cylinder 38 through a pair of cylinder conduits 39,40. The pilot control valve 23 is connected to opposite ends of the directional valve 28 of the control valve 21 through a pair of pilot lines 41,42. The pilot control valve 24 is connected to the directional valve 28 of the control valve 22 through a pair of pilot lines 43,44.

The second hydraulic circuit 14 similarly includes a variable displacement pump 46 connected to the tank 17, a supply conduit 47 connected to the pump 46, a return conduit 48 connected to the tank 17 and to the return conduit 19, a plurality of pressure compensated, pilot operated control valves 49,50,51 connected to the supply conduit 47 and the return conduit 48, a plurality of pilot control valves 52,53,54 connected to the pilot supply line 12, and a pressure relief valve 56 connected between the supply and return conduits 47,48. The variable displacement pump 46 has a pressure responsive displacement controller 57 for controlling the output flow and pressure of the pump 46.

Each of the control valves 49,50,51 includes a directional valve 58 and a pressure compensating valve 59. The directional valves 58 have a pair of infinitely variable metering orifices 60 and are connected to the supply conduit 47 and to the return conduit 48. The pressure compensating valves 59 are individually disposed downstream of the metering orifices 60 in series flow relationship through a feeder passage 61 and a return passage 62. The directional valve 58 of the control valve 49 is connected to a double acting hydraulic cylinder 63 through a pair of cylinder conduits 64,65. The directional valves 58 of the control valves 50,51 are connected to a pair of reversible hydraulic motors 66,67 through respective pairs of motor conduits 68,69, and 70,71. The pilot control valve 52 is connected to opposite ends of the directional valve 58 of the control valve 49 through a pair of pilot lines 72,73. The pilot control valve 53 is connected to opposite ends of the directional valve 58 of the control valve 50 through a pair of pilot lines 74,75. The pilot control valve 54 is connected to the directional valve 58 of the control valve 51 through a pair of pilot lines 76,77.

The first hydraulic circuit 13 also includes a signal means 81 for sensing the load pressures of the control valves 21,22 and delivering a control signal corresponding to the highest load pressure of the first circuit 13 to a control line 82. The signal means 81 includes a pair of signal lines 83,84 connected to the control valves 21,22 respectively, a shuttle valve 86 connected to the signal lines 83,84 and an output line 87 connected to the shuttle valve 86. The signal means 81 also includes a signal duplicating valve 88 connected to the supply conduit 18 and to the control line 82. The control line 82 and the output line 87 are connected to opposite ends of the signal duplicating valve. An orifice 89 is disposed in the control line 82. A signal relief valve 91 is connected to the control line 82 downstream of the orifice 89.

Similarly, the second hydraulic circuit 14 also includes a signal means 92 for sensing the load pressures of the control valves 49,50,51 and delivering a control signal corresponding to the highest load pressure of the second hydraulic circuit to a control line 93. The signal means 92 includes a plurality of signal lines 94,95,96, a pair of shuttle valves 97,98 connected to the signal lines 94,95,96, and an output line 99 connected to the shuttle valve 98. The signal means 92 also includes a signal duplicating valve 101 connected to the supply conduit 47 and the control line 93. The control line 93 and the output line 99 are connected to opposite ends of the signal duplicating valve 101. The control line 93 is connected to a signal relief valve 102 through an orifice 103.

The first hydraulic circuit 13 further includes a common signal delivery line 104 connected to the displacement control 27 of the variable displacement pump 16 and to the pressure compensating valves 29 of the control valves 21,22. Similarly, the second hydraulic circuit 14 includes a signal delivery line 105 connected to the displacement controller 57 of the variable displacement pump 46 and to the pressure compensators 59 of the control valves 49,50,51.

A combiner valve 106 is connected to the supply conduits 18,47 and is movable between a first position at which the supply conduits are in communication with each other and a second position at which the supply conduits are isolated from each other. The combiner valve 106 is a pilot operated valve and has opposite ends 107,108 and a spring 109 disposed at the end 107 resiliently urging the valve to the second position.

A valve means 111 is connected to the control lines 82,93 of the signal means 81,92 and is movable between a first position at which the higher control signal in the control lines 82,93 is delivered to the pump displacement controllers 27,57 of both pumps 16,46 and a second position at which the control signal in the control line of one of the hydraulic circuits 13 or 14 is blocked from the displacement controller of the pump of the other hydraulic circuit. The valve means 111 for example can include a pilot operated signal valve 112 and a plurality of shuttle valves 113,114,115. The shuttle valve 113 is suitable connected to the control lines 82,93 and to the signal valve 112 for delivering the higher of the two control signals in the control lines to the signal valve 112. The shuttle valve 114 is connected to the control line 82, the delivery line 104, and a combining line 116 connected to the pilot operated valve 112. Similarly, the shuttle valve 115 is connected to the control line 93, the delivery line 105, and the combining line 116. The shuttle valve 114 is functional to deliver the higher of the control signals in the control line 82 or the combining line 116 to the delivery line 104. The shuttle valve 115 is functional to deliver the higher of the control signals in the control line 93 or the combining line 116 to the delivery line 105. The signal valve 112 has opposite ends 118,119 and a spring 120 disposed at the end 118 and normally biasing the signal valve 112 to the position shown.

A means 122 is provided for normally maintaining the combiner valve 106 and the signal valve 112 at their first positions. Such means 122 can be, for example, a pilot line 123 normally in communication with the pilot supply line 12 for delivering pilot fluid to the end 108 of the combiner valve 106 and to the end 119 of the signal valve 112.

A means 124 is provided for selectively moving the combiner valve 106 and the valve means 111 to their second positions only when the summed highest pressures from one of a preselected number of the pilot lines 41–44 of the first circuit 13 and from one of a preselected number of the pilot lines 72–77 of the second circuit 14 exceed a predetermined magnitude which is greater than the maximum pilot pressure independently transmitted through any single one of the pilot lines. In this embodiment, the preselected pilot lines of the first circuit are pilot lines 42,44, while the preselected pilot lines of the second circuit are pilot lines 72,74,75,76,77. The means 124 can include, for example, a summing valve 126, a first shuttle valve network 127 connected to the pilot lines 42,44 and to the summing valve 126 and a second shuttle valve network 128 connected to the preselected pilot lines 72,74,75,76,77 and to the summing valve 126. The summing valve 126 is disposed between the pilot supply line 12 and the pilot line 123 and is movable between a first position at which the pilot supply line 12 is in communication with the pilot line 123 and a second position at which the pilot supply line 12 is blocked from the pilot line 123. The summing valve has opposite ends 129,130, a spring 131 disposed at the end 130 for resiliently biasing the summing valve to the first position and a pair of actuators 132,133 disposed at the end 129. The first shuttle valve network 127 includes a shuttle valve 135 connected to the pilot lines 42,44 and to the actuator 132. The shuttle valve 135 is operative to direct the higher of the pilot pressures in the pilot lines 42,44 to the actuator 132. The shuttle valve network 128 includes a plurality of shuttle valves 136,137,138,139 interconnected with each other and the pilot lines 72,74,75,76,77 and to the actuator 133 in a manner to deliver the higher of the pilot pressures in the lines 72,74–77 to the actuator 133.

Figure 2A:
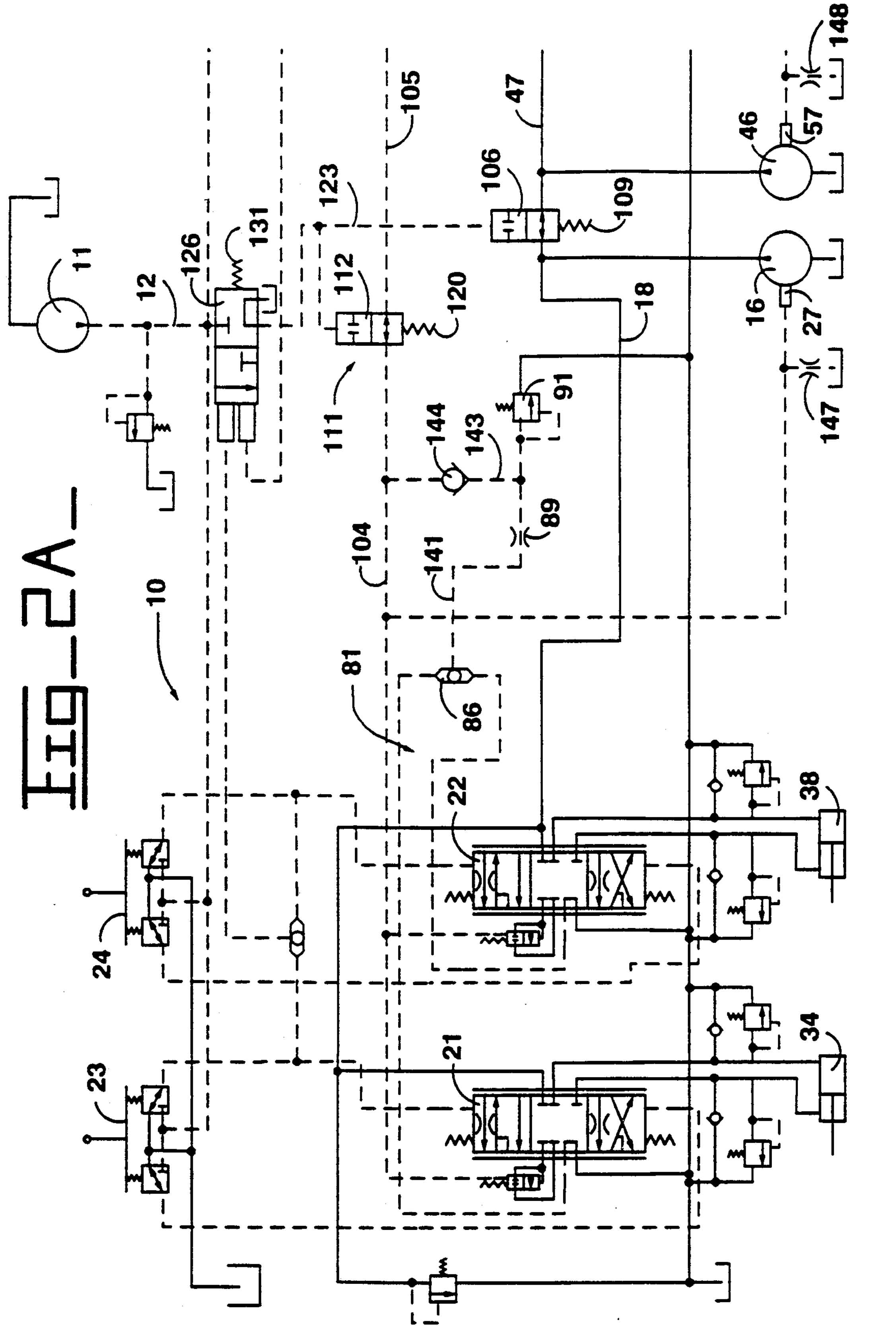
FIGS. 2A and 2B are schematic illustrations of another embodiment of the present invention.
Figure 2B:
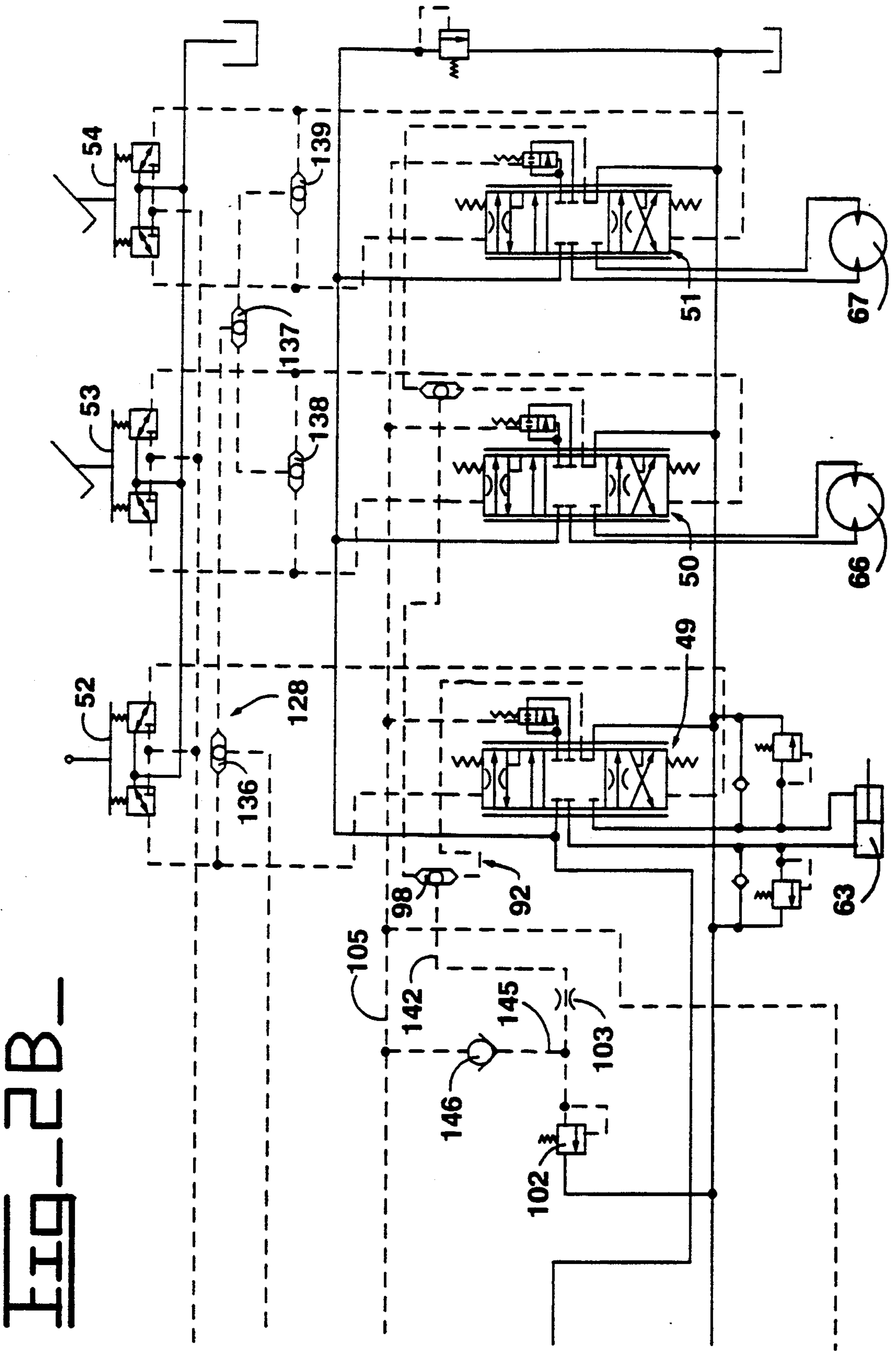

Another embodiment of the hydraulic control system 10 of the present invention is disclosed in FIGS. 2A and 2B. It is noted that the same reference numerals of the first embodiment are used to designate similarly constructed counterpart elements of this embodiment. In this embodiment, however, the signal duplicating valves shown in the first embodiment have been omitted and the signal means 81 includes a control line 141 connecting the shuttle valve 86 to the signal relief valve 91 through the orifice 89 and a control line 142 connecting the shuttle valve 98 of the signal means 92 to the signal relief valve 102 through the orifice 103. Also in this embodiment, both the combiner valve 106 and the signal valve 112 of the valve means 111 are biased to their first positions by the respective springs 109 and 120 and are moved to their second positions by pressurized pilot fluid in the pilot line 123. A control signal feed line 143 is connected to the control line 141 between the orifice 89 and the relief valve 91 and to the signal valve 112 and the delivery line 104 through a check valve 144. Similarly, a control signal feed line 145 is connected to the control line 142 between the orifice 103 and the signal relief valve 102 and to the signal valve 112 and the delivery line 105 through a check valve 146. The delivery lines 104,105 are connected to the tank 17 through a pair of bleed off orifices 147,148, respectfully. Finally, the operation of the summing valve 126 is reversed so that the spring 131 resiliently biases the summing valve to the second, flow blocking position.

In both embodiments, the double acting hydraulic cylinders 34,38,63 represents the cylinders for controlling actuation of a bucket, stick and boom respectively of a hydraulic excavator while the reversible motors 66,67 represent the track drive motors of a hydraulic excavator.

Industrial Applicability

Prior to starting the power source driving the pilot pump 11 and the pumps 16 and 46, the summing valve 126, the signal valve 112, and the pilot operated combiner valve 106 of the embodiment of FIGS. 1A and 1B will be in the position shown in the drawings. However, once the pilot pump 11 is operational, the pressure of the pilot fluid in the pilot supply line 12 passes through the summing valve 126 and into the pilot line 123 where it acts on the end 119 of the signal valve 112 and the end 108 of the combiner valve 106. When the pressure of the pilot fluid reaches the operating pressure, the signal valve 112 is moved leftwardly to its first position permitting fluid communication therethrough and the combiner valve 106 is moved downwardly to its first position at which the supply conduits 18 and 47 are in communication with each other. The summing valve 126 will remain in the position shown until specified events occur as will hereinafter be described.

In the operation of the embodiment of FIGS. 1A and 1B, actuation of any of the hydraulic cylinders 34,38, or 63, or the hydraulic motors 66,67 is initiated by manually manipulating the appropriate one of the pilot control valves 23,24,52,53, or 54. For example, to extend the hydraulic cylinder 34, the pilot control valve 23 is moved in the appropriate direction to direct pressurized pilot fluid through the pilot line 42 to move the directional valve 28 of the control valve 21 downwardly to an operating position. At this position, fluid from the supply conduit 18 passes through the metering orifice 31, the feeder passage 32, the pressure compensating valve 29, the return passage 33, the directional valve 28 of the control valve 21 and through the cylinder conduit 37 to the hydraulic cylinder 34. The quantity or flow rate of fluid passing through the metering orifice 31 is determined by the size of the metering orifice which in turn is determined to the extent to which the directional valve 28 of the control valve 21 is moved toward the operating position. The extent of such movement is determined by the pressure of the pilot fluid in the pilot line 42 as determined by the extent of the movement of the pilot control valve 23. The fluid exhausted from the hydraulic cylinder passes through the cylinder conduit 36 and the directional valve 28 of the control valve 21 to the return conduit 19 and to the tank 17.

The load pressure generated by the resistance to movement of the hydraulic cylinder 34 is transmitted through the signal line 83, the shuttle valve 86, and the output line 87 to the end of the signal duplicating valve 88. The load pressure applied to the end of the duplicating valve adjusts the position of the duplicating valve so that the pressurized fluid passing therethrough from the supply conduit 18 is substantially equal to the load pressure in the output line 87 and becomes a control signal. The control signal in the control line 82 passes through the shuttle valve 114 and the delivery line 104 to the displacement controller 27 of the pump 16 and to the pressure compensator valves 29 of both the control valves 21,22. If the hydraulic cylinder 63 or hydraulic motors 66,67 are not being operated, the control signal in the control line 82 passes through the shuttle valve 113, the signal valve 112, the combining line 116, the shuttle valve 115, and the delivery line 105 to the displacement controller 57 of the hydraulic pump 46. Since the combiner valve 106 is in the open position, the output of both pumps 16 and 46 will be delivered to the control valve 21 for use thereby. The control signal directed to the displacement controllers 27 and 57 adjusts the output of the pumps 16 and 46 so that the combined output flow matches the flow rate of the fluid passing through the metering orifice 31 with the pressure level of the fluid in the supply conduits 18 and 47 being a predetermined margin greater than the load pressure.

Pressurized pilot fluid from the line 42 also passes through the shuttle valve 135 to the actuator 132. However, that pressure by itself acting on the actuator 132 will not move the summing valve 126 to the second position even when the pressure in the pilot line 42 reaches its maximum permitted pressure.

To retract the hydraulic cylinder 34, the pilot control valve 23 is manipulated in the opposite direction to direct pressurized pilot fluid through the pilot line 41 to move the directional valve 28 of the control valve 21 to its second operating position to direct pressurized fluid through the cylinder conduit 36 similarly to that described above. Likewise, extension or retraction of the hydraulic cylinder 38 is accomplished in a similar manner by proper manipulation of the pilot control valve 24. If both of the hydraulic cylinders 34 and 38 are being operated simultaneously, the shuttle valve 86 will allow the higher of the load pressures in the signal lines 83,84 to pass therethrough into the output line 87 so that the control signal in the control line 82 substantially equals the highest load pressure in the first circuit 13. The pumps 16,46 will react accordingly to maintain sufficient flow to meet the demands of the first circuit 13 with the pressure in the supply conduits 18,47 being greater than the control signal by the preselected margin. If both hydraulic cylinders 34,36 are being extended, the highest pilot pressure in the pilot lines 42 or 44 will be transmitted to the actuator 132 of the summing valve 126.

Similarly, extension or retraction of the hydraulic cylinder 63 is accomplished by appropriate movement of the pilot control valve 52 for directing pressurized pilot fluid through the appropriate pilot line 72 or 73. Likewise, operation of the hydraulic motors 66,67 in a first direction is accomplished by directing pressurized pilot fluid through the pilot lines 74 and 76 while actuation of the motors in the opposite direction is accomplished by directing pressurized pilot fluid through the pilot lines 75 and 77. If two or more of the hydraulic cylinders 63 or hydraulic motors 66,67 are operated simultaneously, the shuttle valves 97,98 will direct the highest load pressure of the second hydraulic circuit 14 to the output line 99 resulting in the generation of a control signal in the line 93 substantially equal to such highest load pressure. If a control signal is also present in the control line 82, the shuttle valve 113 will direct the highest control signal to the appropriate delivery line 104 or 105 of the other circuit. For example, if the control signal in the control line 82 is higher than the control signal in the control line 93, the shuttle valve 113 will direct the control signal from the control line 82 through the signal valve 112, the combining line 116, the shuttle valve 115, the delivery line 105, and to the displacement controller 57 of the pump 46. As described earlier, the control signal in the control line 82 passes through the shuttle valve 114, the delivery line 104 and to the displacement controller 27 of the pump 16.

The pressure compensating valves 29 of the control valves 21,22 and the pressure compensating valves 59 of the control valves 49,50,51 operate in the usual manner wherein if the fluid demand by two or more of the control valves exceeds the output capability of the pumps 16 and 46, the output flow from the pumps will be proportioned to the appropriate hydraulic cylinders and/or motors in accordance with the operating positions of the effected control valves.

The shuttle valves 136,137,138, and 139 are operative to direct the highest of the pilot pressures in the pilot lines 72,74,75,76, or 77 to the actuator 133 of the summing valve 126. If pilot pressure is also being directed by the shuttle valve 135 to the actuator 132 and the combined pilot pressures in the actuators 132,133 exceed a predetermined Value, the summing valve will be moved rightwardly to block communication of pressurized pilot fluid into the pilot line 123 allowing the springs 120 and 109 to move the signal valve 112 and the combiner valve 106 to their first positions shown in the drawings. With the combiner valve 106 in its first position, the supply conduits 18 and 47 are blocked from each other. With the signal valve 112 in its first position, the control signal in the control line 82 is blocked from reaching the displacement controller 57 of the pump 46 and the control signal from the control line 93 is blocked from reaching the displacement controller 27 of the pump 16. Thus, the first and second hydraulic circuits are isolated from each other such that the output from pump 16 is available only to the first circuit and the output from pump 46 is available only to the second circuit.

In the embodiment of FIGS. 2A and 2B, the summing valve 126 is normally biased to the second position shown at which the pilot supply conduit 12 is blocked from the pilot line 123. Moreover, the signal valve 112 and the combiner valve 106 are biased to their positions shown by the springs 120 and 109 respectively, with both valves being moved downwardly to their first positions when pressurized pilot fluid is transmitted to the pilot line 123. Actuation of the hydraulic cylinders 34 and 38 of the first circuit and the hydraulic cylinder 63 and hydraulic motors 66,67 of the second circuit is essentially the same as that described above with the exception that instead of using a duplicated load pressure control signal, the actual load pressure is used for the pump controls. More specifically, if the actual load pressure in the control line 141 is higher than the load pressure in the control line 142, the control pressure from line 141 will pass through the check valve 144, the line 143, the delivery line 104, to the displacement controller 27 of the pump 16. The load pressure in line 143 also passes through the signal valve 112 and delivery line 105 to the displacement controller 57 of the pump 46. The check valve 146 prevents the load pressure from passing therethrough into the control line 142. As with the earlier embodiment, the load pressure in the delivery lines 104 and 105 is directed to the pressure compensators 29 of the control valves 21 and 22, and to the compensators 59 of the control valves 49,50, and 51. Thus as previously described, the fluid demand by either the first or second hydraulic circuit is supplied by both pumps 16 and 46. In the event that the combined pilot pressures directed to the actuators 132 and 133 exceed the predetermined value, the summing valve 126 will move to a position at which pressurized pilot fluid from the pilot supply line 12 will be directed to the pilot line 123, thus causing the signal valve 112 and the combiner valve 106 move to their first positions to isolate the first and second hydraulic circuits 13,14 from each other.

In view of the above, it is readily apparent that the structure of the present invention provides an improved load sensing hydraulic control system in which the output of the pumps 16,46 of both circuits 13,14 is normally combined for use by both circuits and is selectively isolated from each other so that each pump serves only the respective circuit in response to certain operating conditions. This is accomplished by the use of the combiner valve 106 connected to the supply conduits 18,47 of both circuits and the valve means 111 connected to the control lines 82,93/141,142 of both circuits. The combiner valve is normally maintained in a position at which the output flow of both pumps is normally made available to both hydraulic circuits so that the output capability of both pumps can be used to satisfy the demand for fluid by a single control valve or by one or more of the control valves from each circuit. The valve means is normally maintained in a position at which the highest load pressure of the control system is communicated to both pumps when the output flow thereof is being combined. The combiner valve and the valve means are selectively moved to a position to isolate the first and second hydraulic circuits from each other and to communicate the highest load pressure of each circuit only to the displacement controller of the pump connected to that circuit when the summed highest pressures from one of preselected pilot lines of the first circuit and from one of preselected pilot lines of the second circuit exceed a predetermined magnitude.

Other aspects, objects, and advantages of this invention can be obtained from a study of the drawings, the disclosure, and the appended claims.

We claim:

1. A hydraulic control system having a source of pressurized pilot fluid comprising:

first and second hydraulic circuits, each circuit including a variable displacement pump having a pressure responsive displacement controller, a supply conduit connected to the pump, a plurality of pressure compensated pilot operated control valves connected to the supply conduit, a plurality of pilot control valves connected to the source of pilot fluid, a pair of pilot lines connecting each of the pilot control valves to a respective one of the control valves to transmit pressurized pilot fluid thereto, and signal means for sensing the load pressures at the control valves and delivering a control signal corresponding to the highest load pressure of the circuit to a control line;

a combiner valve connected to the supply conduits of both hydraulic circuits and being movable between a first position at which the supply conduits are in communication with each other and a second position at which the supply conduits are isolated from each other;

valve means connected to the control lines of both hydraulic circuits and being movable between a first position at which the higher control signal in the control lines is delivered to the displacement controller of both pumps and a second position at which the control signal in the control line of one of the hydraulic circuits is blocked from the displacement controller of the pump of the other circuit;

means for normally maintaining the combiner valve and the valve means at their first position; and means for selectively moving the combiner valve and the valve means to their second positions only when the summed highest pressures from one of preselected ones of the pilot lines of the first circuit and from one of preselected ones of the pilot lines of the second circuit exceed a predetermined magnitude which is greater than the maximum pilot pressure individually transmitted through any single one of the preselected pilot lines.

2. The hydraulic control system of claim 1 wherein the one pilot line of the first hydraulic circuit is one of preselected ones but not all of the pilot lines of the first hydraulic circuit.

3. The hydraulic control system of claim 2 wherein the one pilot line of the second hydraulic circuit is one of preselected ones but not all of the pilot lines of the second hydraulic circuit.

4. The hydraulic control system of claim 3 wherein the valve means includes a signal valve movable between a first position to establish the first position of the valve means and a second position to establish the second position of the valve means.

5. The hydraulic circuit of claim 4 wherein the valve means further includes a first shuttle valve connected to the control lines to communicate the higher of the control signals to the signal valve, a combining line connected to the signal valve to receive the higher of the control signals at the first position of the signal valve, a second shuttle valve connected to the control line of the first hydraulic circuit and to the combining line to communicate the higher of the control signals therethrough to the displacement controller of the pump of the first hydraulic circuit, and a third shuttle valve connected to the control line of the second hydraulic circuit and to the combining line to communicate the higher of the control signals therein to the displacement controller of the pump of the second hydraulic circuit.

6. The hydraulic control system of claim 5 wherein the signal valve blocks the higher of the control signals from the combining line at its second position.

7. The hydraulic control system of claim 5 wherein the signal means includes a pair of signal lines connected to the control valves, a shuttle valve connected to the signal lines, and an output line connected to the shuttle valve.

8. The hydraulic control system of claim 7 wherein the signal means further includes a signal duplicating valve connected to the supply conduit and to the control line, and the control line and the output line are connected to opposite ends of the signal duplicating valve.

9. The hydraulic control system of claim 4 wherein the valve means further includes a first control signal feed line connected to the control line of the first hydraulic circuit and to both the signal valve and to the displacement controller of the pump of the first circuit, a check valve disposed in the first control signal feed line, a second control signal feed line connected to the control line of the second hydraulic circuit and to both the signal valve and the displacement controller of the pump of the second hydraulic circuit, and a check valve disposed in the second control signal feed line.

10. The hydraulic control system of claim 4 wherein the combiner valve has a spring disposed at one end thereof to bias it to the second position and is moved to its first position by pressurized pilot fluid directed to its other end, and the signal valve has a spring disposed at one end thereof biasing it to its second position and is moved to the first position by pressurized pilot fluid acting on the other end, said maintaining means includes a pilot line communicating fluid from the pilot supply line to the other ends of both the combiner valve and the signal valve.

11. The hydraulic control system of claim 10 wherein said selectively moving means includes a summing valve disposed in the pilot line and movable between a first position establishing communication of pressurized pilot fluid through the pilot line and a second position blocking communication of fluid through the pilot line, said summing valve having a spring biasing it to its first position and being preloaded to a preselected value.

12. The hydraulic control system of claim 11 wherein the summing valve has a pair of actuators and the selective moving means further includes a first shuttle valve means for communicating the higher of the pilot pressures in the preselected ones of the pilot lines of the first hydraulic circuit to one of the actuators of the summing valve and a second shuttle valve means for communicating the higher of the pilot pressures in the preselected ones of the pilot lines of the second hydraulic circuit to the other of the actuators of the summing valve.

13. The hydraulic control system of claim 4 wherein said maintaining means includes a spring biasing the combiner valve to its first position and a spring biasing the signal valve to its first position.

14. The hydraulic control system of claim 13 wherein said selectively moving means includes a summing valve disposed in the pilot line and movable between a first position establishing communication of pressurized fluid through the pilot line and a second position blocking communication of pilot fluid through the pilot line and having a spring biasing it to its second position.

15. The hydraulic control system of claim 14 wherein the summing valve has a pair of actuators and the selectively moving means includes a first shuttle valve means for communicating the higher of the pilot pressures in the preselected ones of the pilot lines of the first hydraulic circuit to one of the actuators of the summing valve and a second shuttle valve means for communicating the higher of the pilot pressures in the preselected ones of the pilot lines of the second hydraulic circuit to the other of the actuators of the summing valve.

* * * * *